United States Patent
Chen (10) Patent No.: US 10,803,339 B2
(45) Date of Patent: Oct. 13, 2020

(54) DATA PROCESSING METHOD AND DEVICE FOR ELECTRONIC BOOK, AND MOBILE TERMINAL

(71) Applicant: ZHANGYUE TECHNOLOGY CO., LTD, Beijing (CN)

(72) Inventor: Xingang Chen, Beijing (CN)

(73) Assignee: ZHANGYUE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/469,117

(22) PCT Filed: Jun. 28, 2017

(86) PCT No.: PCT/CN2017/090533
§ 371 (c)(1),
(2) Date: Jun. 12, 2019

(87) PCT Pub. No.: WO2018/107720
PCT Pub. Date: Jun. 21, 2018

(65) Prior Publication Data
US 2020/0019805 A1    Jan. 16, 2020

(30) Foreign Application Priority Data
Dec. 12, 2016    (CN) .......................... 2016 1 1138710

(51) Int. Cl.
*G06F 3/048*    (2013.01)
*G06K 9/20*    (2006.01)
(Continued)

(52) U.S. Cl.
CPC ......... *G06K 9/2081* (2013.01); *G06F 3/0483* (2013.01); *G06F 3/0485* (2013.01);
(Continued)

(58) Field of Classification Search
CPC . G06K 9/2081; G06F 15/0291; G06F 3/0483; G06F 3/04883; G06F 3/0485; G06F 3/0488
(Continued)

(56) References Cited

U.S. PATENT DOCUMENTS 8,952,912 B1 * 2/2015 Hock .................... G06F 3/0483
345/173
10,296,128 B1 * 5/2019 Nold .................. G06F 3/04883
(Continued)

FOREIGN PATENT DOCUMENTS

| CN | 101930339 A | 12/2010 |
| CN | 102207863 A | 10/2011 |

(Continued)

OTHER PUBLICATIONS

International Patent Application No. PCT/CN2017/090533; Int'l Search Report; dated Oct. 9, 2017; 4 pages.

*Primary Examiner* — Renee D Chavez
*Assistant Examiner* — Jianmei F Duckworth
(74) *Attorney, Agent, or Firm* — BakerHostetler (57) ABSTRACT

Disclosed are a data processing method and device for an electronic book, and a mobile terminal. The data processing method includes: receiving a pressing and sliding operation on a current page of the electronic book; marking words located in a range between a starting position for the pressing and sliding operation and a current position for the pressing and sliding operation, and determining whether the current position is located in a preset trigger region; and when the current position is located in the preset trigger region and a trigger time reaches a preset value, displaying a next page or a previous page of the current page of the electronic book according to the position in the preset trigger region and marking words continuously till a word corre-
(Continued)

sponding to a position where the pressing and sliding operation ends.

11 Claims, 6 Drawing Sheets

(51) Int. Cl.
    *G06F 3/0483*     (2013.01)
    *G06F 15/02*     (2006.01)
    *G06F 3/0488*     (2013.01)
    *G06F 3/0485*     (2013.01)

(52) U.S. Cl.
    CPC ........ *G06F 3/0488* (2013.01); *G06F 3/04883* (2013.01); *G06F 15/0291* (2013.01)

(58) Field of Classification Search
    USPC ........................................................ 715/860
    See application file for complete search history.

(56) References Cited

U.S. PATENT DOCUMENTS

| | | | |
|---|---|---|---|
| 2008/0180408 A1* | 7/2008 | Forstall | G06F 3/0485 345/177 |
| 2011/0166777 A1* | 7/2011 | Chavakula | G01C 21/3667 701/533 |
| 2015/0248215 A1* | 9/2015 | Graf | G06F 3/04812 715/822 |

FOREIGN PATENT DOCUMENTS

| | | |
|---|---|---|
| CN | 102681786 A | 9/2012 |
| CN | 102768614 A | 11/2012 |
| CN | 105302464 A | 2/2016 |
| CN | 106775399 A | 5/2017 |

* cited by examiner

DATA PROCESSING METHOD AND DEVICE FOR ELECTRONIC BOOK, AND MOBILE TERMINAL

CROSS REFERENCE TO RELATED APPLICATIONS

This application is the U.S. National Stage of International Application No. PCT/CN2017/090533 filed Jun. 28, 2017, which based upon and claims priority to Chinese Patent Application No. 201611138710.6, titled "Data Processing Method and Device for Electronic Book, and Mobile Terminal", filed on Dec. 12, 2016 with the State Intellectual Property Office of People's Republic of China, the entire contents of which are incorporated herein by reference.

TECHNICAL FIELD

The disclosure relates to the technical field of data processing, and in particular to a data processing method and device for an electronic book, and a mobile terminal.

BACKGROUND

An electronic book is a publication which is integrated with digitized words, pictures, voices and images by means of the computer technology. With the expanding of the internet technology, the traditional way of reading on paper has been gradually replaced by the electronic book. People increasingly intend to download the electronic book via a reading application by means of the internet and computer technology.

During a process of reading the electronic book, a reader generally needs to mark certain words in the electronic book for reviewing or writing reflections. The words to be marked may be not located in a same page of the electronic book. In this case, cross-page marking is to be performed. For example, a first word marking operation is performed on a first page, after the first word marking operation is completed, a page turning operation is performed on the electronic book to enter a next page, and a second word marking operation is performed on the next page, so as to completely mark the words which need to be marked.

Although the words can be completely marked with the above manner. However, for the reading application, it may be regarded as performing multiple different marking operations in the above manner, resulting in that the marking processing is to be performed multiple times, and a data processing load of a device installing the reading application is increased. For the reader marking the words of the electronic book, page turning and marking operations are required to be performed multiple times, resulting in that the operations are complicated and inflexible, and the reading experience of the reader is influenced.

SUMMARY

According to embodiments of the present disclosure, a data processing method and device for an electronic book, and a mobile terminal are provided, to solve the problem in the conventional technology that the operation is inconvenient and the device processing load is high when cross-page marking is performed on words in the electronic book.

According to an aspect of the embodiments of the present disclosure, a data processing method for an electronic book is provided, which includes: receiving a pressing and sliding operation on a current page of the electronic book; marking words located in a range between a starting position for the pressing and sliding operation and a current position for the pressing and sliding operation, and determining whether the current position is located in a preset trigger region; and when the current position is located in the preset trigger region and a trigger time reaches a preset value, displaying a next page or a previous page of the current page of the electronic book according to the position in the preset trigger region and marking words continuously till a word corresponding to a position where the pressing and sliding operation ends.

According to another aspect of the embodiments of the present disclosure, a data processing device for an electronic book is provided, which includes: at least one processor; and at least one memory; wherein one or more programs are stored in the at least one memory, and when executed by the at least one processor, the one or more programs cause the at least one processor to: receive a pressing and sliding operation on a current page of the electronic book; mark words located in a range between a starting position for the pressing and sliding operation and a current position for the pressing and sliding operation, and determine whether the current position is located in a preset trigger region; and display a next page or a previous page of the current page of the electronic book according to the position in the preset trigger region and mark words continuously till a word corresponding to a position where the pressing and sliding operation ends, when the current position is located in the preset trigger region and a trigger time reaches a preset value.

According to another aspect of the embodiments of the present disclosure, a mobile terminal is provided, which includes a processor, a memory, a communication interface and a communication bus, where the processor, the memory and the communication interface perform intercommunication via the communication bus, and the memory is configured to store at least one executable instruction, where the executable instruction causes the processor to perform the data processing method for an electronic book described above.

According to another aspect of the embodiments of the present disclosure, a non-transitory computer readable storage medium is further provided. The computer readable storage medium stores executable instructions for: receiving a pressing and sliding operation on a current page of the electronic book; marking words located in a range between a starting position for the pressing and sliding operation and a current position for the pressing and sliding operation, and determining whether the current position is located in a preset trigger region; and when the current position is located in the preset trigger region and a trigger time reaches a preset value, displaying a next page or a previous page of the current page of the electronic book according to the position in the preset trigger region and marking words continuously till a word corresponding to a position where the pressing and sliding operation ends.

According to another aspect of the embodiments of the present disclosure, a computer program product is further provided, which includes computer programs stored in the above non-transitory computer readable storage medium.

With the technical solutions provided in the embodiments of the present disclosure, the preset trigger region is located in the electronic book page; when a reader needs to perform a pressing and sliding operation to select content of the electronic book, the electronic book turns page automatically if the pressing and sliding operation is located in the preset trigger region, such that the reader may continuously select the content of the electronic book after page turning, thereby selecting the content of different pages of the electronic book through one operation. In addition, in selecting and marking the content of the electronic book, the starting position and the ending position for the pressing and sliding operation are determined on basis of the whole pressing and sliding operation rather than a single page, such that the starting position and the ending position for the pressing and sliding operation does not depend on a certain page of the electronic book.

According to the solutions provided in the embodiments of the present disclosure, in one aspect, the reader may select and mark cross-page words through one operation, thereby reducing an operation load for the reader and improving operation flexibility. In another aspect, a device installed with a reading application may perform cross-page selection and cross-page marking on the content of the electronic book in response to one pressing and sliding operation without turning pages and selecting for multiple times, thereby reducing the data processing amount and reducing a data processing load of the device.

DETAILED DESCRIPTION

Hereinafter specific implementations of the embodiments of the present disclosure are further described in detail in conjunction with drawings (the same reference numerals in several drawings represent same elements) and embodiments. The following embodiments are only used to illustrate the present disclosure rather than limit the scope of the present disclosure.

It should be understood by those skilled in the art that terms such as "first" and "second" in the embodiments of the present disclosure are used to distinguish different steps, devices or modules, and the terms neither represent particular technical meanings, nor represent a necessary logical order therebetween.

First Embodiment

Figure 1:
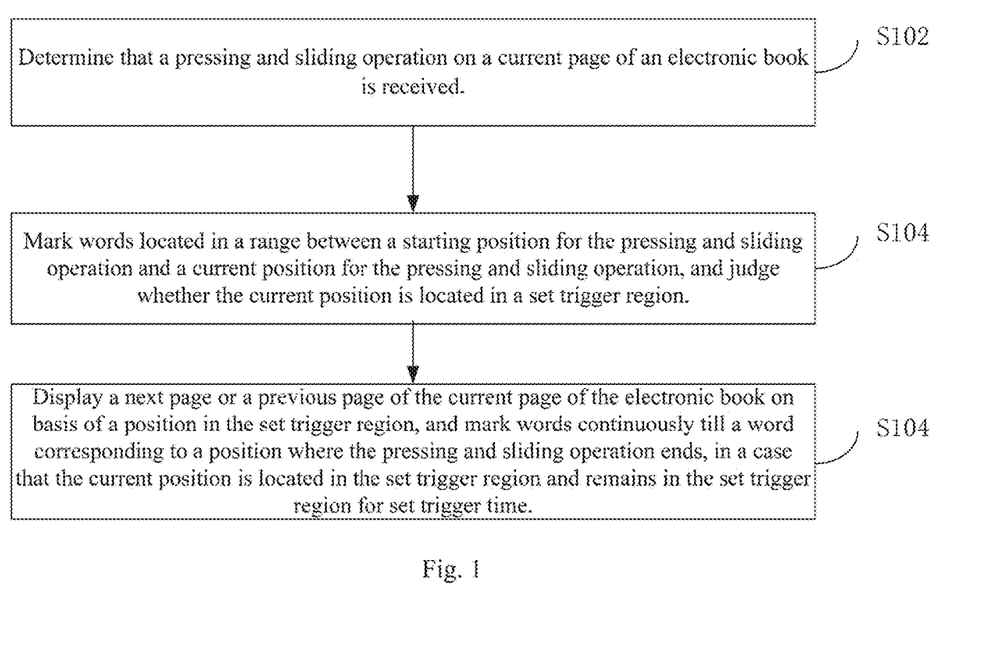
FIG. 1 is a flowchart showing steps of a data processing method for an electronic book according to a first embodiment of the present disclosure.

Reference is made to FIG. 1 which is a flowchart showing steps of a data processing method for an electronic book according to a first embodiment of the present disclosure.

The data processing method for an electronic book according to the embodiment includes steps S102 to S104 in the following.

In step S102, a pressing and sliding operation on a current page of an electronic book is received.

In the embodiment of the present disclosure, a reader may use the reading application to read the electronic book. During a process of reading the electronic book, the reader needs to mark content of the electronic book. In the embodiment of the present disclosure, for the above requirement, a data processing solution for an electronic book is provided, such that the reader may perform marking of the content of the electronic book conveniently in reading the electronic book, particularly cross-page marking.

The pressing and sliding operation differs from page turning of the electronic book by only a sliding operation. In selecting and marking the content of the electronic book, first a touch screen is pressed, and then a sliding operation is performed, thereby forming the pressing and sliding operation, and thus selecting and marking words in a range corresponding to the pressing and sliding operation.

In step S104, words located in a range between a starting position for the pressing and sliding operation and a current position for the pressing and sliding operation are marked, and it is determined whether the current position is located in a preset trigger region.

The preset trigger region is determined by those skilled in the art according to actual cases. Generally, a region in a certain range of a lower right corner of the electronic book page may be set as a page down trigger region, and a region in a certain range of a top left corner of the electronic book page may be set as a page up trigger region.

During the execution of the pressing and sliding operation, the reading application can acquire the current position for the pressing and sliding operation in real time, and mark words located in a range between the starting position and the current position for the pressing and sliding operation, such as in a manner of highlighting or underlining. In addition, cross-page marking may be performed on the words. Therefore, it is required to determine whether the pressing and sliding operation is performed in a preset trigger region, that is determining whether the current position for the pressing and sliding operation is located in the preset trigger region. When the current position is located in the preset trigger region and a trigger time reaches a preset value, such as one second is reached, the electronic book is triggered to perform page-turning operation.

In step S106, when the current position is located in the preset trigger region and a trigger time reaches a preset value, a next page or a previous page of the current page of the electronic book is displayed according to the position in the preset trigger region and words are marked continuously till a word corresponding to a position where the pressing and sliding operation ends.

a next page or a previous page of the current page of the electronic book is displayed according to the position in the preset trigger region, and words are marked continuously till a word corresponding to the position where the pressing and sliding operation ends.

For example, when the current position for the pressing and sliding operation remains for one second in the page down trigger region, the electronic book is triggered to perform down-page turning. During the down-page turning, the pressing and sliding operation does not end. When the electronic book turns to the next page, the pressing and sliding operation may slide to an appropriate position on basis of an actual requirement of the reader and then end at the position. In this way, all words located in the range between the starting position and the ending position for the pressing and sliding operation can be marked.

if page turning is still required after the electronic book turns to a new page, the pressing and sliding operation is performed in the preset trigger region on the next page and the trigger time reaches a preset value, that is, a second down-page turning operation is performed, and so on, until the pressing and sliding operation ends.

With the data processing solutions for the electronic book provided in the embodiments of the present disclosure, the trigger region is arranged in the electronic book page; when a reader needs to perform a pressing and sliding operation to select content of the electronic book, the electronic book turns page automatically if the pressing and sliding operation is performed in the trigger region, such that the reader can continuously select the content of the electronic book after page turning, thereby selecting the content of different pages of the electronic book through one operation. In addition, in selecting and marking the content of the electronic book, the starting position and the ending position for the pressing and sliding operation are determined on basis of the whole pressing and sliding operation rather than a single page, such that the starting position and the ending position for the pressing and sliding operation does not depend on a certain page of the electronic book.

According to the solutions provided in the embodiment, in one aspect, the reader can select and mark cross-page words through one operation, thereby reducing an operation load for the reader and improving operation flexibility. In another aspect, a device installed with a reading application can perform cross-page selection and cross-page marking on the content of the electronic book in response to one pressing and sliding operation without turning pages and selecting for multiple times, thereby reducing the data processing amount and reducing a data processing load of the device.

Second Embodiment

Figure 2:
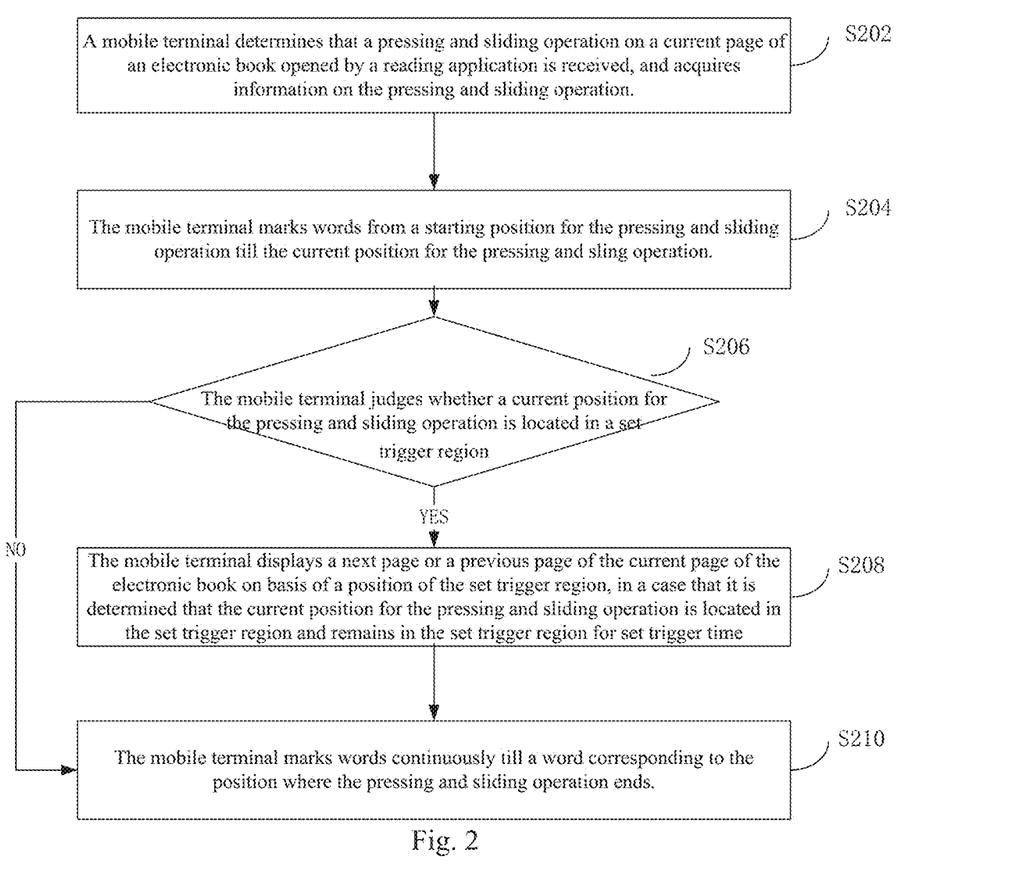
FIG. 2 is a flowchart showing steps of a data processing method for an electronic book according to a second embodiment of the present disclosure.

Reference is made to FIG. 2 which is a flowchart showing steps of a data processing method for an electronic book according to a second embodiment of the present disclosure.

In the embodiment, the data processing method for an electronic book according to the present disclosure is illustrated schematically by assuming that the method is performed by a mobile terminal and a mobile phone, and an electronic book opened via the reading application is taken as an application scenario. However, it should be understood by those skilled in the art that for the scenario or execution body similar to that in the embodiment of the present disclosure, the corresponding data processing for the electronic book can be realized accordingly with reference to the embodiment of the present disclosure.

The data processing method for the electronic book in the embodiment includes steps S202 to S210 in the following.

In step S202, a mobile terminal receives a pressing and sliding operation on a current page of the electronic book, and acquires information on the pressing and sliding operation.

The information on the pressing and sliding operation includes position information on the pressing and sliding operation. The position information includes a starting position and a current position.

In step S204, the mobile terminal marks words from the starting position till the current position for the pressing and sliding operation.

In a manner, the mobile terminal acquires a first absolute position where a word corresponding to coordinates of the starting position; and marks words from the first absolute position till a second absolute position where a word corresponding to coordinates of the current position for the pressing and sling operation is located.

For example, when the words in the 50-th paragraph of a certain electronic book needs to be marked, and the 50-th paragraph displays at a last paragraph of a fifth page and a first paragraph of a sixth page, that is, the 50-th paragraph displays in a manner of cross-page. In this case, the starting position for the pressing and sliding operation is an absolute position of a first word in the last paragraph of the fifth page in the electronic book. In the embodiment of the present disclosure, the absolute position of a certain word in the electronic book is determined with reference to a position of a first word of the electronic book rather than a starting position of a certain page, for example, an N-th word since the first word of the electronic book. The absolute position is adopted, such that selection of words of the electronic book does not depend on information on a certain specific page, thereby effectively performing cross-page selection and marking on the words of the electronic book.

The present disclosure is not limited to the absolute position, and other manners in which the starting position and the ending position for the pressing and sliding operation can be effectively marked are also applicable. For example, the current position is marked as a temporary position or an intermediate position, and the current position is removed after the ending position of pressing and sliding operation is acquired. The specific manners are not limited in the embodiment of the present disclosure.

In step S206, the mobile terminal determines whether the current position for the pressing and sliding operation is located in a preset trigger region; step S208 is performed if a determination result is positive; otherwise, step S210 is performed.

The preset trigger region may be determined by those skilled in the art according to actual cases without influencing reading of the electronic book.

In the embodiment of the present disclosure, the preset trigger region includes a page up trigger region and a page down trigger region. The electronic book turns to a previous page with triggering the page up trigger region. The electronic book turns to a next page with triggering the page down trigger region.

In a manner, the page up trigger region may indicate a set range between an upper border of the electronic book page and an upper edge of a display screen, and the page down trigger region may indicate a set range between a lower border of the electronic book page and a lower edge of the display screen. Generally, the displaying of the electronic book does not occupy the whole display screen, and there is a certain distance between the border of the electronic book page and the edge of the display screen. The page up trigger region and the page down trigger region are arranged by using the distance. In one aspect, it will not affect the display of the e-book and the reader's reading. In another aspect, the trigger region is extended as much as possible in a case of effectively utilizing the existing screen space, thereby facilitating usage of the reader. The set range is determined by those skilled in the art according to actual cases and is not limited in the embodiment of the present disclosure, as long as it is convenient for the reader to touch the screen without influencing reading.

In a manner, the trigger region may display explicitly, for example display with a preset color or a preset format (such as lines of a certain format). That is, after it receives the pressing and sliding operation on the current page, the preset trigger region may be displayed on the current page, according to a preset rule. The preset rule may be determined by those skilled in the art according to actual cases, including but not limited to displaying with the preset color such as yellow, or displaying with the preset format such as oblique lines. By explicitly displaying the preset trigger region, the reader can accurately identify the preset trigger region, thereby improving the operation efficiency. Accordingly, when it is detected that the pressing and sliding operation ends (such as the reader lifts the finger from the touch screen), the displaying of the preset trigger region is exited, thereby avoiding influencing reading of the reader and improving reading experience of the reader.

In step S208, the mobile terminal determines that the current position for the pressing and sliding operation is located in the preset trigger region and a trigger time reaches a preset value, a next page or a previous page of the current page of the electronic book is displayed according to the position of the preset trigger region.

For example, if the current position for the pressing and sliding operation is in the page down trigger region, a next page of the current page is displayed. If the current position for the pressing and sliding operation is in the page up trigger region, a previous page of the current page is displayed.

In a implementation, if the current position for the pressing and sliding operation is located in the preset trigger region, a progress bar is displayed. The progress bar is used to indicate progress whether the trigger time reaches the preset value, that is, a time progress for triggering to display a next page or a previous page. By displaying the progress bar, the reader can definitely know the time progress of waiting to turn to the next page or the previous page, and thus determines operations in the period, for example, remaining in the preset trigger region till the time is reached or deciding to cancel the page-turning operation in the period and so on, thereby greatly improving the operation flexibility and improving the reading experience of the reader.

The progress bar may be set by those skilled in the art by using any manners according to actual cases. The manners include but not limited to: displaying the progress bar via a text display box, an electronic book magnifier box or other suitable box or visual window. The progress bar is displayed via the text display box such as the TEXTVIEW box of the ANDROID system or the electronic book magnifier box such as the IMAGEVIEW box, thereby effectively utilizing the existing box, improving the implementation efficiency of the progress bar, and saving the implementation cost of the progress bar.

In a case that the trigger time reaches the preset value, a next page or a previous page of the current page may be displayed according to a position of the preset trigger region. In a case that the trigger time does not reach the preset value and it is detected that the current position goes beyond the preset trigger region, displaying of the progress bar is exited and the acquired period is reset. For example, if the current position remains in the trigger region for one second, a corresponding next page or previous page is displayed. If the pressing and sliding operation lasts for 0.5 second in the trigger region, and the reader notices that the page turning trigger time is not reached by the progress bar and decides to end the pressing and sliding operation, the reader may lift the finger from the touch screen, or slides the finger away from the range of the trigger region. At this time, the mobile terminal does not display the progress bar, and resets data related to the progress bar. When the finger slides in the trigger region again, re-time the finger's stay in the trigger region. The progress bar is displayed or removed as required, thereby not influencing reading of the reader, and facilitating flexible operations of the reader.

The progress for the progress bar is displayed in real time. Therefore, once the current position for the pressing and sliding operation is located in the preset trigger region, a time period during which the current position remains in the preset trigger region is acquired in real time. Then, a proportion relational between the time period and the preset value is determined in real time. Subsequently, the progress bar is drawn and displayed in real time according to the proportional relation.

The progress bar may be drawn by any suitable manner. The manner includes but not limited to drawing on basis of the OpenGL graph drawing engine. The OpenGL is a special graph program interface which defines a cross-programming language and cross-platform programming interface specification. The interface is irrelevant to hardware. With the interface, 2D or 3D drawings can be drawn conveniently. With the OpenGL, not only drawing with 2D effect such as 2D sticker can be achieved, but also drawings with 3D special effect and particle special effect can be achieved. The present disclosure is not limited to the OpenGL, and other manners such as Unity or OpenCL is also applicable.

In a implementation, a display color for the progress bar may be set in advance. The display color may be a color with a transparency value or a color without transparency value. In a manner. Compared with a non-transparent progress bar, the transparent progress bar has better impression; and with the transparent progress bar, displaying of words in the box is not influenced in a case that the progress bar is displayed via the text display box or the electronic book magnifier box. In a case that the color with the transparency value is set in advance, the mobile terminal draws and displays the progress bar in real time according to the proportional relation. Specifically, the mobile terminal first acquires a color with the transparency value for drawing the progress bar. Then, the progress bar is drawn and displayed in real time according to the proportional relation by using the color with the transparency value.

Figure 3:
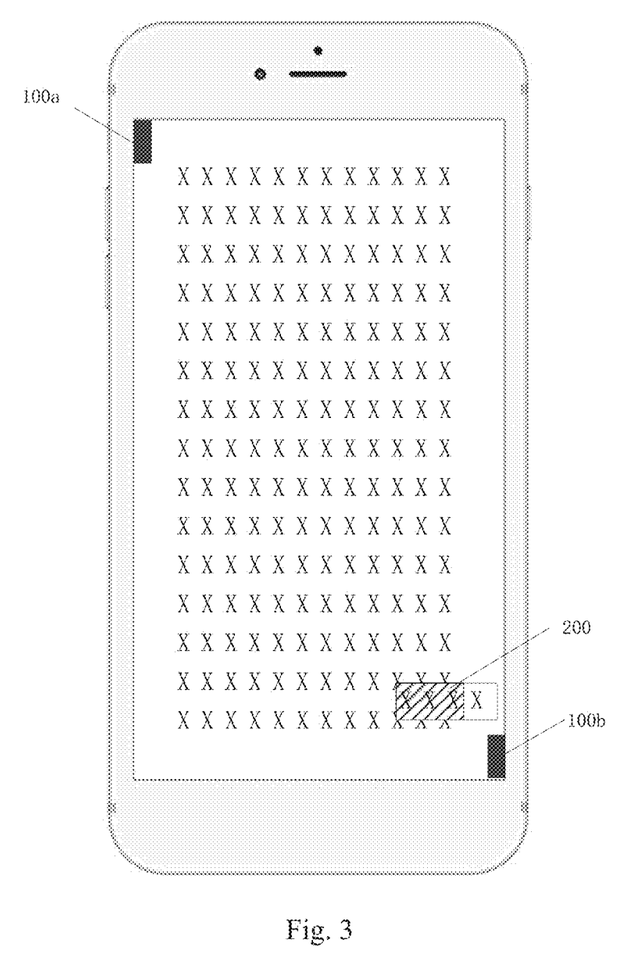
FIG. 3 is a schematic diagram showing a progress bar for triggering page turning of an electronic book according to an embodiment of the present disclosure.

On basis of the above description, FIG. 3 is a schematic diagram showing a progress bar for triggering page turning of the electronic book according to an embodiment of the present disclosure. In FIG. 3, when a pressing and sliding operation is performed, displaying of an page up trigger region 100*a* and a page down trigger region 100*b* is triggered. When the pressing and sliding operation ends, the page up trigger region 100*a* and the page down trigger region 100*b* are not displayed any more. When the pressing and sliding operation is performed in the page turning trigger region such as the page down trigger region 100*b*, it is triggered to display the progress bar 200. A progress indicated by the progress bar 200 is refreshed in real time according to a period in which the current pressing and sliding operation remains in the down page turning region 100*b*. When the trigger time reaches the preset value, the electronic book is triggered to turn pages.

In step S210, the mobile terminal marks words continuously till a word corresponding to the position where the pressing and sliding operation ends.

In a case that step S210 is performed after step S208, that is, the page turning operation of the electronic book is performed, the mobile terminal marks words continuously in the new page after page turning till a word corresponding to the position where the pressing and sliding operation ends. In a case that step S210 is performed after step S206, that is, no page turning operation of the electronic book is performed and the pressing and sliding operation remains in the current page of the electronic book, the mobile terminal marks words located in a range between the starting position and the ending position for the pressing and sliding operation on the current page.

For example, in implementing step S210, words may be marked from the second absolute position till a third absolute position in the electronic book where a word corresponding to coordinates of an ending position for the pressing and sliding operation is located.

According to the embodiment, effective cross-page selection and marking on the content of the electronic book is realized, such that the data processing load of the mobile terminal and the operation load of the reader are reduced, thereby improving flexibility of the page turning operation for the reader, and improving the reading experience of the reader.

Third Embodiment

Figure 4:
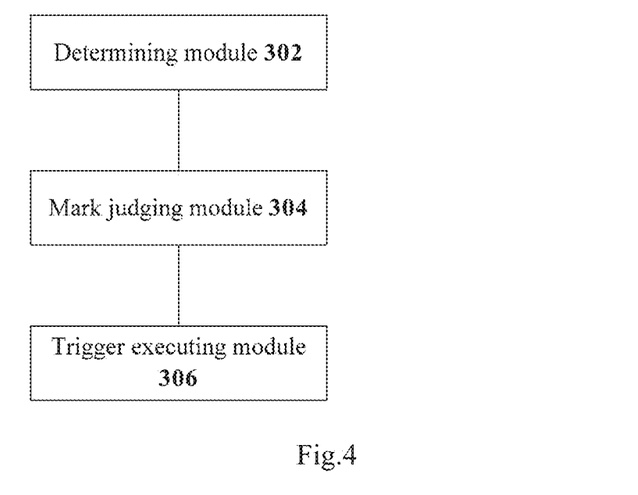
FIG. 4 is a block diagram showing a structure of a data processing device for an electronic book according to a third embodiment of the present disclosure.

Reference is made to FIG. 4 which is a block diagram showing a structure of a data processing device for an electronic book according to a third embodiment of the present disclosure.

The data processing device for the electronic book according to the embodiment includes a receiving module 302, a mark determining module 304, and a trigger executing module 306. The receiving module 302 is configured to receive a pressing and sliding operation on a current page of the electronic book. The mark determining module 304 is configured to mark words located in a range between a starting position for the pressing and sliding operation and a current position for the pressing and sliding operation, and determine whether the current position is located in a preset trigger region. The trigger execution module 306 is configured to display a next page or a previous page of the current page of the electronic book according to the position in the preset trigger region and mark words continuously till a word corresponding to a position where the pressing and sliding operation ends when the current position is located in the preset trigger region and a trigger time reaches a preset value.

With the data processing device for the electronic book provided in the embodiments of the present disclosure, the preset trigger region is located in the electronic book page; when a reader needs to perform a pressing and sliding operation to select content of the electronic book, the electronic book turns page automatically if the pressing and sliding operation is located in the preset trigger region, such that the reader may continuously select the content of the electronic book after page turning, thereby selecting the content of different pages of the electronic book through one operation. In addition, in selecting and marking the content of the electronic book, the starting position and the ending position for the pressing and sliding operation are determined on basis of the whole pressing and sliding operation rather than a single page, such that the starting position and the ending position for the pressing and sliding operation does not depend on a certain page of the electronic book.

According to the data processing device for the electronic book provided in the embodiment, in one aspect, the reader may select and mark cross-page words through one operation, thereby reducing an operation load for the reader and improving operation flexibility. In another aspect, a device installed with a reading application may perform cross-page selection and cross-page marking on the content of the electronic book in response to one pressing and sliding operation without turning pages and selecting for multiple times, thereby reducing the data processing amount and reducing a data processing load of the device.

The data processing device for the electronic book according to the embodiment may be an independent device which includes corresponding functional modules configured to achieve corresponding data processing functions for the electronic book. Alternatively, the data processing device may be arranged appropriately in the mobile terminal for example, and the mobile terminal achieves the corresponding data processing functions for the electronic book via the device.

Fourth Embodiment

Figure 5:
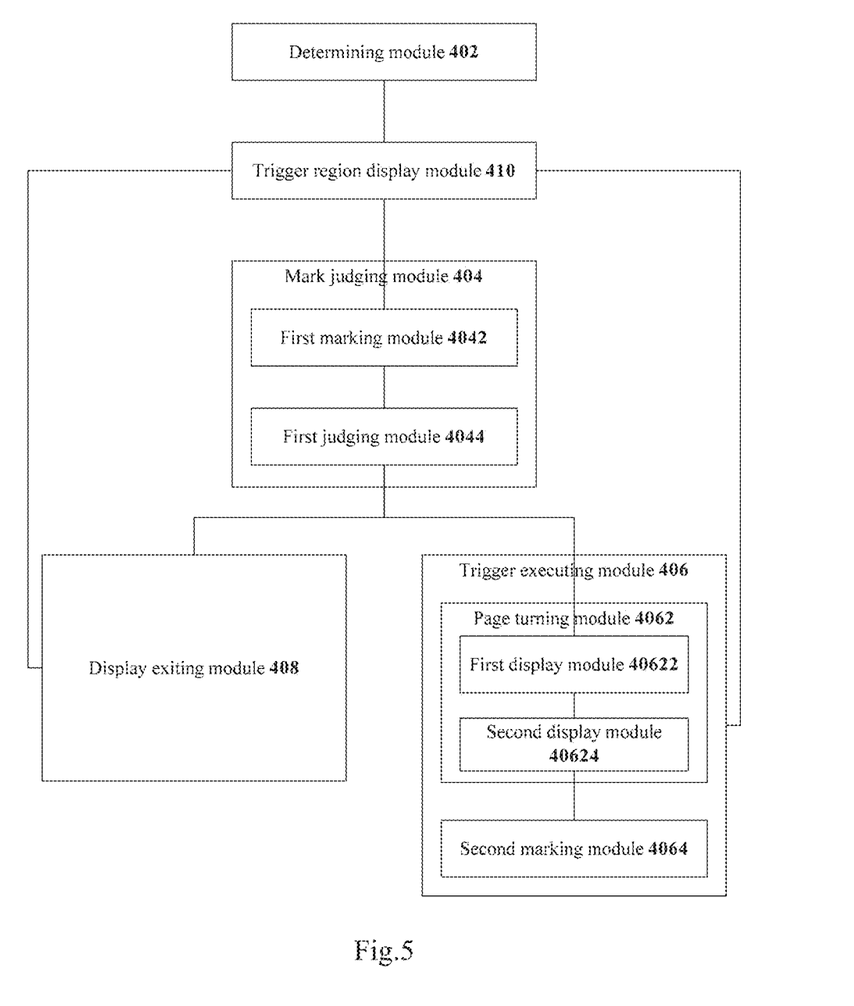
FIG. 5 is a block diagram showing a structure of a data processing device for an electronic book according to a fourth embodiment of the present disclosure.

Reference is made to FIG. 5 which is a block diagram showing a structure of a data processing device for an electronic book according to a fourth embodiment of the present disclosure.

The data processing device for the electronic book in the embodiment includes: a receiving module 402, a mark determining module 404 and a trigger executing module 406. The receiving module 402 is configured to receive a pressing and sliding operation on a current page of the electronic book. The mark determining module 404 is configured to mark words located in a range between a starting position for the pressing and sliding operation and a current position for the pressing and sliding operation, and determine whether the current position is located in a preset trigger region. The trigger execution module 406 is configured to display a next page or a previous page of the current page of the electronic book according to the position in the preset trigger region and mark words continuously till a word corresponding to a position where the pressing and sliding operation ends when the current position is located in the preset trigger region and a trigger time reaches a preset value.

Optionally, the mark determining module 404 includes a first marking module 4042 and a first judging module 4044. The first marking module 4042 is configured to acquire a first absolute position of the word, in the electronic book, corresponding to coordinates of the starting position for the pressing and sliding operation; and mark words from the first absolute position till a second absolute position where a word corresponding to coordinates of the current position for the pressing and sliding operation is located. The first determining module 4044 is configured to determine whether the current position is located in the preset trigger region.

Optionally, the trigger execution module 406 includes a page turning module 4062 and a second marking module 4064. The page turning module 4062 is configured to display the next page or the previous page of the current page according to the position in the preset trigger region, when the current position is located in the preset trigger region and the trigger time reaches the preset value. The second marking module 4064 is configured to mark words continuously from the second absolute position till a third absolute position in the electronic book where a word corresponding to coordinates of the position where the pressing and sliding operation ends is located.

Optionally, the page turning module 4062 includes a first display module 40622 and a second display module 40624. The first display module 40622 is configured to display a progress bar when the current position is located in the preset trigger region. The progress bar is used to indicate progress whether the trigger time reaches the preset value. The second display module 40624 is configured to display the next page or the previous page of the current page according to the position in the preset trigger region, when the progress bar indicates that the trigger time reaches the preset value.

Optionally, the first display module 40622 is configured to acquire, in real time, a time period during which the current position remains in the preset trigger region, once the current position is located in the preset trigger region; determine, in real time, a proportional relation between the time period and the preset value; and draw and display, in real time, the progress bar on basis of the proportional relation.

Optionally, for drawing and displaying, in real time, the progress bar on basis of the proportional relation, the first display module 40622 is configured to acquire a color with a transparency value for drawing the progress bar; and draw and display, in real time, the progress bar on basis of the proportional relation by using the color with the transparency value.

Optional, the data processing device for the electronic book in the embodiment further includes a display exiting module 408. The display exiting module 408 is configured to exit displaying the progress bar and resetting the acquired time period, when the progress bar indicates that the trigger time does not reach the preset value and the current position for the pressing and sliding operation goes beyond the trigger region.

Optionally, the first display module 40622 is configured to display the progress bar through a text display box or an electronic book magnifier box, in a case that the current position is located in the preset trigger region.

Optionally, the data processing device for the electronic book in the embodiment further includes a trigger region display module 410. The trigger region display module 410 is configured to, according to a preset rule, display the preset trigger region in the current page on which the pressing and sliding operation is performed, once the pressing and sliding operation on the current page is received; and exit displaying the preset trigger region, when it is detected that the pressing and sliding operation ends.

Optionally, the preset trigger region includes a page up trigger region and a page down trigger region, the page up trigger region is located in a range between an upper border of the electronic book page and an upper edge of a display screen, and the page down trigger region is located in a range between a lower border of the electronic book page and a lower edge of the display screen.

The data processing device for the electronic book in the embodiment is configured to perform the data processing method for the electronic book described in the above multiple method embodiments, and achieves the same beneficial effect as the method embodiments, which is not described in detail herein.

The data processing device for the electronic book according to the embodiment may be an independent device which includes corresponding functional modules configured to achieve corresponding data processing functions for the electronic book. Alternatively, the data processing device may be arranged appropriately in the mobile terminal for example, and the mobile terminal achieves the corresponding data processing functions for the electronic book via the device.

Fifth Embodiment

Figure 6:
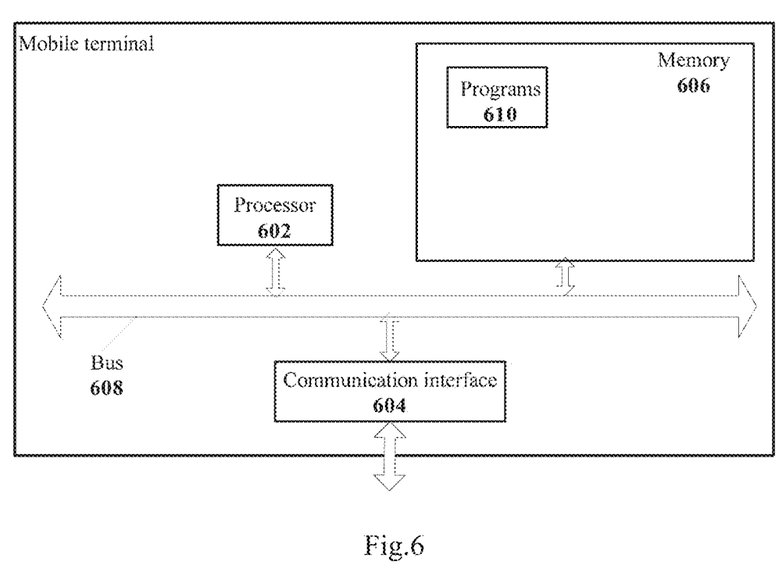
FIG. 6 is a schematic structural diagram of a mobile terminal according to a fifth embodiment of the present disclosure.

Reference is made to FIG. 6 which is a schematic structural diagram of a mobile terminal according to a fifth embodiment of the present disclosure. Implementations of the mobile terminal are not limited in the embodiment of the present disclosure.

As shown in FIG. 6, the mobile terminal may include a processor 602, a communication interface 604, a memory 606 and a communication bus 608.

The processor 602, the communication interface 604 and the memory 606 perform intercommunication via the communication bus 608.

The communication interface 604 is used for communicating with other devices, such as network element like another mobile terminal and a server.

The processor 602 is configured to execute programs 610, particularly execute steps in the data processing method for the electronic book in the above embodiments.

The programs 610 may include program codes. The program codes include computer operation instructions.

The processor 602 may be a central processing unit (CPU), an application specific integrated circuit (ASIC), or one or more integrated circuits configured to implement the embodiments of the present disclosure. One or more processors included in the mobile terminal may be processors of a same type, such as one or more CPUs; or may be processors of different types, such as one or more CPUs and one or more ASICs.

The memory 606 is configured to store programs 610 and related data for the electronic book. The memory 606 may include a high speed RAM memory, or a non-volatile memory, such as at least one magnetic disk memory.

The programs 610 instruct the processor 602 to: receive a pressing and sliding operation on a current page of the electronic book; mark words located in a range between a starting position for the pressing and sliding operation and a current position for the pressing and sliding operation, and determine whether the current position is located in a preset trigger region; and display a next page or a previous page of the current page of the electronic book according to the position in the preset trigger region and mark words continuously till a word corresponding to a position where the pressing and sliding operation ends, when the current position is located in the preset trigger region and a trigger time reaches a preset value.

In an optional embodiment, for marking words located in the range between the starting position and the current position for the pressing and sliding operation, the programs 610 instruct the processor 602 to: acquire a first absolute position of the word, in the electronic book, corresponding to coordinates of the starting position for the pressing and sliding operation; and mark words from the first absolute position till a second absolute position where a word corresponding to coordinates of the current position for the pressing and sliding operation is located. For marking words continuously until the pressing and sliding operation ends, the programs 610 further instruct the processor 602 to: mark words continuously from the second absolute position till a third absolute position in the electronic book where a word corresponding to coordinates of the position where the pressing and sliding operation ends is located.

In an optional embodiment, for displaying the next page or the previous page of the current page of the electronic book according to the position in the preset trigger region, the programs 610 instruct the processor 602 to: displaying a progress bar when the current position is located in the preset trigger region, where the progress bar is used to indicate progress whether the trigger time reaches the preset value; and when the progress bar indicates that the trigger time reaches the preset value, displaying the next page or the previous page of the current page according to the position in the preset trigger region.

In an optional embodiment, for displaying the progress bar when the current position is located in the preset trigger region, the programs 610 instruct the processor 602 to: acquire, in real time, a time period during which the current position remains in the preset trigger region, once the current position is located in the preset trigger region; determine, in real time, a proportional relation between the time period and the preset value; and draw and display, in real time, the progress bar according to the proportional relation.

In an optional embodiment, for drawing and displaying, in real time, the progress bar according to the proportional relation, the programs 610 instruct the processor 602 to: acquire a color with a transparency value for drawing the progress bar; and draw and display, in real time, the progress bar on basis of the proportional relation by using the color with the transparency value.

In an optional embodiment, the programs 610 further instruct the processor 602 to: when the progress bar indicates that the trigger time does not reach the preset value and the current position for the pressing and sliding operation goes beyond the trigger region, exit displaying the progress bar and reset the acquired time period.

In an optional embodiment, the programs 610 instruct the processor 602 to display the progress bar via a text display box or an electronic book magnifier box.

In an optional embodiment, the programs 610 further instruct the processor 602 to: display the preset trigger region in the current page on which the pressing and sliding operation is performed according to a preset rule, once the pressing and sliding operation on the current page is received; and exit displaying of the preset trigger region in a case that it is detected that the pressing and sliding operation ends.

In an optional embodiment, the preset trigger region includes an page up trigger region and a page down trigger region. The page up trigger region indicates a set range between an upper border of the electronic book page and an upper edge of a display screen. The page down trigger region indicates a set range between a lower border of the electronic book page and a lower edge of the display screen.

For implementation of steps in the programs 610, one may refer to corresponding description of steps and units in the above embodiments of data processing for the electronic book, which are not described in detail herein. It should be understood by those skilled in the art that, for convenience and briefness of description, one may refer to corresponding description in the method embodiments for a specific process of the devices and modules described above, which are not described in detail herein.

With the mobile terminal in the embodiment, effective cross-page selection and marking on the content of the electronic book is achieved, such that the data processing load of the mobile terminal and the operation load for the reader are reduced, thereby improving flexibility of the page turning operation for the reader, and improving the reading experience of the user.

It should be noted that, the component/step described in the embodiments of the present disclosure may be divided into multiple components/steps, and two or more components/steps or a part of components/steps may be combined into a new component/step as required, to achieve the object of the embodiments of the present disclosure.

The method described in the embodiments of the present disclosure may be implemented via hardware and firmware, may be implemented as applications or computer codes stored in a recording medium (such as CDROM, RAM, floppy disk, hard disk or magnetic-optical disk), or may be implemented as computer codes originally stored in a remote recording medium or a non-transitory machine readable medium and to be downloaded over a network and to be stored in a local recording medium. Therefore, the method described here may be performed by applications stored in the recording medium of a general-purpose computer, a dedicated processor or programmable or dedicated hardware (such as ASIC or FPGA). It should be understood that the computer, the processor, the micro-processing controller or the programmable hardware includes a storage component (such as RAM, ROM and flash memory) which can store or receive applications or computer codes. The processing method described here is performed, in a case that the application or the computer code is accessed and executed by the computer, processor or hardware. In addition, in a case that the general-purpose computer accesses codes for implementing the processing described herein, the general-purpose computer serves as a dedicated computer for performing the processing described herein.

It should be understood by those skilled in the art that, units and method steps described in the embodiments of the present disclosure can be implemented by electronic hardware, or a combination of computer applications and electronic hardware. Depending on specific applications and design constraints of the technical solutions, the functions are achieved by hardware or the application. Those skilled in the art may implement the described functions by using different methods for a specific application. However, the implementation should not be considered as going beyond the scope of the embodiments of the present disclosure.

The above implementations are only used to illustrate the embodiments of the present disclosure, rather than limiting the embodiments of the present disclosure. Those skilled in the art can make various changes and variations without departing from the spirit and scope of embodiments of the present disclosure. Therefore, all equivalent technical solutions fall within the scope of the embodiments of the present disclosure, and the protection scope of the embodiments of the present disclosure should be defined according to claims.

What is claimed is:

1. A data processing method for an electronic book, comprising:
   receiving a pressing and sliding operation on a current page of the electronic book;
   according to a preset rule, displaying a preset trigger region in the current page on which the pressing and sliding operation is performed in response to determining that the pressing and sliding operation on the current page is received;
   marking words located in a range between a starting position of the pressing and sliding operation and a current position of the pressing and sliding operation, and determining whether the current position is located in the preset trigger region;
   displaying a progress bar in response to determining that the current position of the pressing and sliding operation is located in the preset trigger region, wherein the progress bar indicates whether a trigger time reaches a preset value, and wherein the progress bar comprises a box and a progress inside the box;
   displaying a next page or a previous page of the current page according to a position of the preset trigger region in response to determining that the progress bar indicates that the trigger time reaches the preset value;

exiting displaying the progress bar in response to determining that the trigger time does not reach the predetermined value and the current position of the pressing and sliding operation moves outside the preset trigger region;

exiting displaying the preset trigger region in response to detecting that the pressing and sliding operation ends;

marking words continuously till a word corresponding to a position where the pressing and sliding operation ends;

wherein the preset trigger region comprises a page up trigger region and a page down trigger region of a selected electronic book page, the page up trigger region is located in a range between an upper border of the selected electronic book page and an upper edge of a display screen, and the page down trigger region is located in a range between a lower border of the selected electronic book page and a lower edge of the display screen.

2. The method according to claim 1 wherein the marking words located in a range between a starting position for the pressing and sliding operation and a current position for the pressing and sliding operation comprises:

acquiring a first absolute position of the word, in the electronic book, corresponding to coordinates of the starting position for the pressing and sliding operation; and marking words from the first absolute position till a second absolute position where a word corresponding to coordinates of the current position for the pressing and sliding operation is located, and wherein the marking words continuously till a word corresponding to a position where the pressing and sliding operation ends comprises:

marking words continuously from the second absolute position till a third absolute position in the electronic book where a word corresponding to coordinates of the position where the pressing and sliding operation ends is located.

3. The method according to claim 1, wherein the displaying a progress bar when the current position is located in the preset trigger region comprises:

acquiring, in real time, a time period during which the current position remains in the preset trigger region, once the current position is located in the preset trigger region;

determining, in real time, a proportional relation between the time period and the preset value; and drawing and displaying, in real time, the progress bar on basis of the proportional relation.

4. The method according to claim 3, wherein the drawing and displaying, in real time, the progress bar on basis of the proportional relation comprises:

acquiring a color with a transparency value for drawing the progress bar; and drawing and displaying, in real time, the progress bar on basis of the proportional relation by using the color with the transparency value.

5. The method according to claim 1, wherein the displaying a progress bar comprises:

displaying the progress bar through a text display box or an electronic book magnifier box.

6. A data processing device for an electronic book, comprising:
at least one processor; and
at least one memory;

wherein one or more programs are stored in the at least one memory, and when executed by the at least one processor, the one or more programs cause the one processor to:

receive a pressing and sliding operation on a current page of the electronic book;

according to a preset rule, display a preset trigger region in the current page on which the pressing and sliding operation is performed in response to determining that the pressing and sliding operation on the current page is received:

mark words located in a range between a starting position of the pressing and sliding operation and a current position of the pressing and sliding operation, and determine whether the current position is located in the preset trigger region;

display a progress bar in response to determining that the current position is located in the preset trigger region, wherein the progress bar is used to indicate whether a trigger time reaches a preset value, wherein the progress bar comprises a box and a progress inside the box;

display a next page or a previous page of the current page according to a position of the preset trigger region in response to determining that the progress bar indicates that the trigger time reaches the preset value;

exit displaying the progress bar in response to determining that the trigger time does not reach the preset value and the current position of the pressing and sliding operation moves outside the preset trigger region;

exit displaying the preset trigger region in response to detecting that the pressing and sliding operation ends;

mark words continuously till a word corresponding to a position where the pressing and sliding operation ends; and wherein the preset trigger region comprises a page up trigger region and a page down trigger region of a selected electronic book page, the page up trigger region is located in a range between an upper border of the selected electronic book page and an upper edge of a display screen, and the page down trigger region is located in a range between a lower border of the selected electronic book page and a lower edge of the display screen.

7. The device according to claim 6, wherein the at least one processor is further caused to:

acquire a first absolute position of the word, in the electronic book, corresponding to coordinates of the starting position for the pressing and sliding operation; and mark words from the first absolute position till a second absolute position where a word corresponding to coordinates of the current position for the pressing and sliding operation is located, display the next page or the previous page of the current page according to the position in the preset trigger region, when the current position is located in the preset trigger region and the trigger time reaches the preset value; and mark words continuously from the second absolute position till a third absolute position in the electronic book where a word corresponding to coordinates of the position where the pressing and sliding operation ends is located.

8. The device according to claim 6, wherein the at least one processor is furthered caused to:

acquire, in real time, a time period during which the current position remains in the preset trigger region, once the current position is located in the preset trigger region;

determine, in real time, a proportional relation between the time period and the preset value; and draw and display, in real time, the progress bar on basis of the proportional relation.

9. The device according to claim 8, wherein the at least one processor is further caused to: for drawing and displaying, in real time, the trigger progress bar on basis of the proportional relation, acquire a color with a transparency value for drawing the progress bar; and draw and display, in real time, the progress bar on basis of the proportional relation by using the color with the transparency value.

10. The device according to claim 6, wherein the at least one processor is further caused to:

display the progress bar through a text display box or an electronic book magnifier box, in a case that the current position is located in the preset trigger region.

11. A mobile terminal comprising a processor, a memory, a communication interface and a communication bus, wherein the processor, the memory and the communication interface perform intercommunication via the communication bus;

the memory is configured to store at least one executable instruction, wherein the executable instruction causes the processor to perform a data processing method for an electronic book, the data processing method comprising:

receiving a pressing and sliding operation on a current page of the electronic book;

according to a preset rule, displaying a preset trigger region in the current page on which the pressing and sliding operation is performed in response to determining that the pressing and sliding operation on the current page is received;

marking words located in a range between a starting position of the pressing and sliding operation and a current position of the pressing and sliding operation, and determining whether the current position is located in the preset trigger region;

displaying a progress bar in response to determining that the current position of the pressing and sliding operation is located in the preset trigger region, wherein the progress bar indicates whether a trigger time reaches a predetermined value, and wherein the progress bar comprises a box and a progress inside the box;

displaying a next page or a previous page of the current page of the electronic book according to a position of the preset trigger region in response to determining that the progress bar indicates that the trigger time reaches the predetermined value;

exiting displaying the progress bar in response to determining that the trigger time does not reach the predetermined value and the current position of the pressing and sliding operation moves outside the preset trigger region;

exiting displaying the preset trigger region in response to detecting that the pressing and sliding operation ends;

marking words continuously till a word corresponding to a position where the pressing and sliding operation ends;

wherein the preset trigger region comprises a page up trigger region and a page down trigger region of a selected electronic book page, the page up trigger region is located in a range between an upper border of the selected electronic book page and an upper edge of a display screen, and the page down trigger region is located in a range between a lower border of the selected electronic book page and a lower edge of the display screen.

* * * * *